United States Patent Office 2,844,255
Patented July 22, 1958

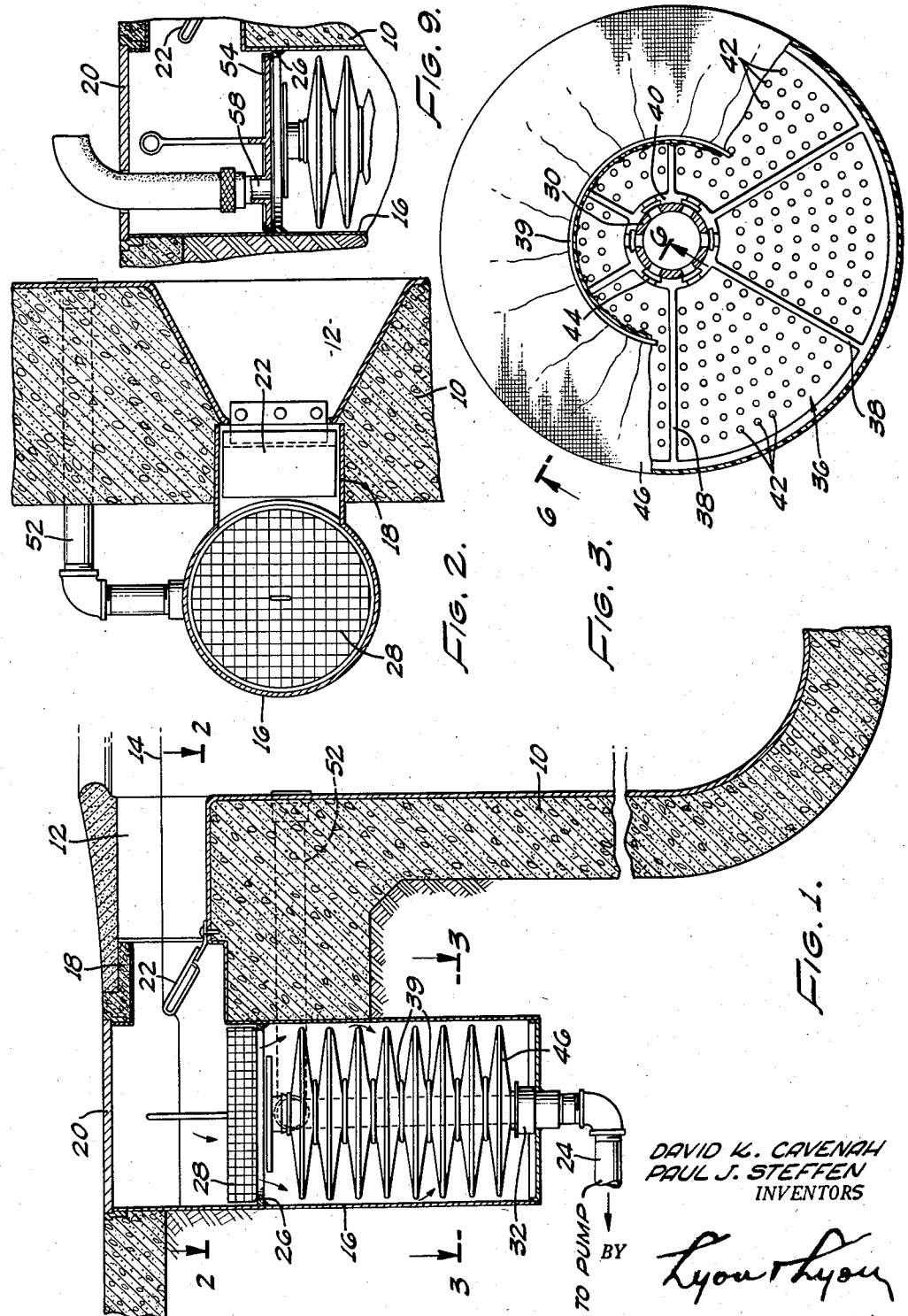

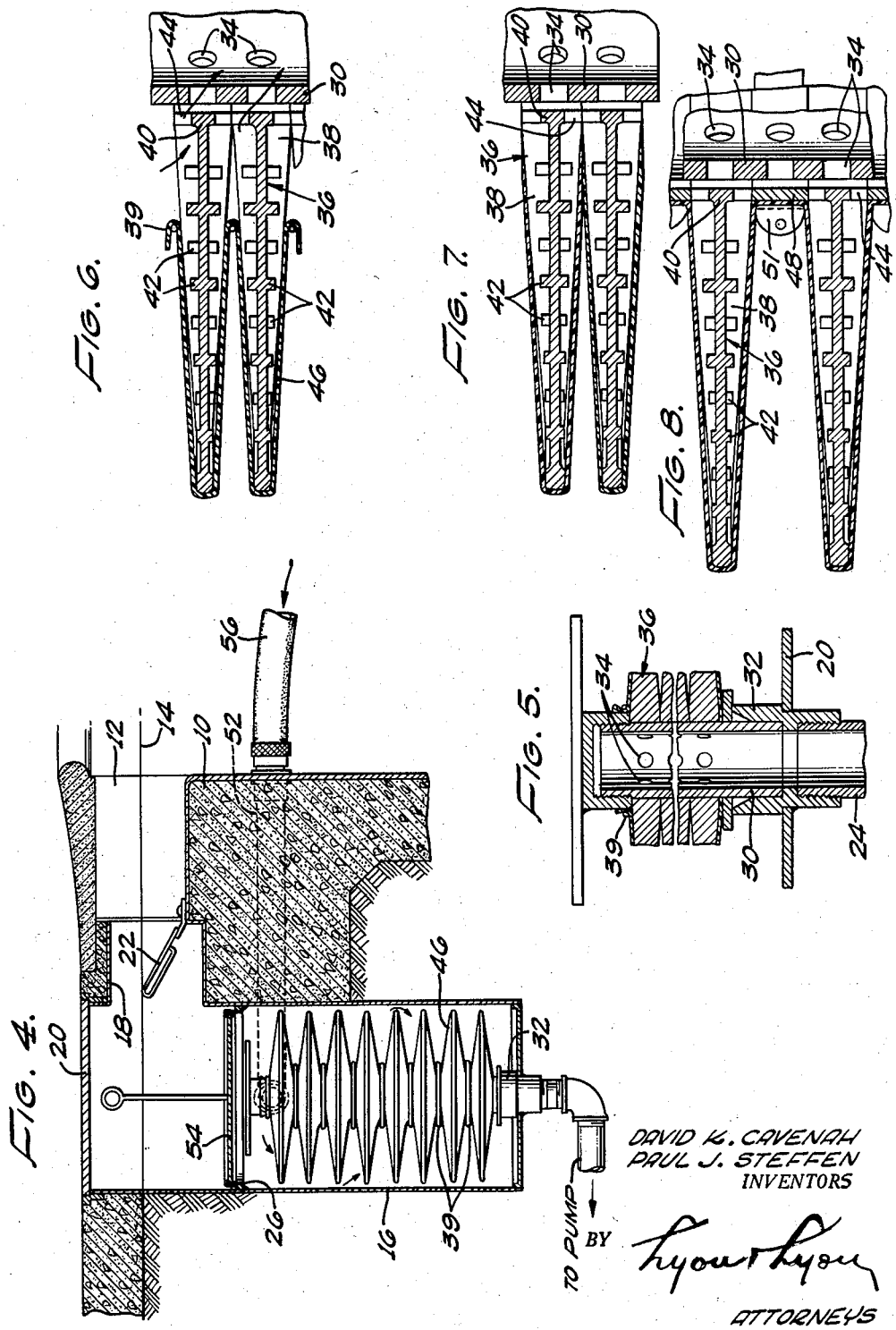

2,844,255

COMBINATION FILTER AND SURFACE SKIMMER

David K. Cavenah, North Hollywood, and Paul J. Steffen, Los Angeles, Calif., assignors to Landon, Inc., North Hollywood, Calif., a corporation of California Application April 6, 1956, Serial No. 576,660

5 Claims. (Cl. 210—170)

This invention relates to an improved combination filter and surface skimmer.

It is an object of this invention to provide a single unit which may be installed in a swimming pool to perform the functions of skimming the surface of the pool as well as filtering the water to remove foreign matter therefrom.

It is a further object of this invention to provide such a unit which may be sealed to receive the flow of water from a vacuum cleaner connection.

It is still a further object of this invention to provide a filter element which has a maximum area exposed to water to be filtered to increase the capacity.

It is still a further object of this invention to provide such a filter which is readily installed and may be easily replaced.

It is still a further object of this invention to provide a filter which may be readily removed without disconnecting any screws, bolts or the like.

Other objects and advantages will be readily apparent from the following description.

In the drawings:

Figure 1 is a side elevation in section of a unit embodying this invention.

Figure 2 is a view taken along line 2—2 of Figure 1.

Figure 3 is a view taken along line 3—3 of Figure 1.

Figure 4 is a view similar to Figure 1, illustrating the use of the device with a vacuum cleaner assembly.

Figure 5 is a longitudinal section of the filter with portions thereof broken away.

Figure 6 is a view taken along line 6—6 of Figure 3.

Figure 7 is a view similar to Figure 6 of a modified form.

Figure 8 is a view similar to Figure 6 of a further modification.

Figure 9 is a view similar to Figure 4 illustrating a further use of the device with a vacuum cleaner assembly.

The pool wall 10 has a passage 12 formed therethrough adjacent the usual water level 14 maintained in the pool. A suitable pit is formed adjacent the passage 12 which receives the collector tank 16 which has a branch 18 which forms a continuation of the passage 12. The upper end of tank 16 is open and a cover 20 fits thereon which is flush with the deck surrounding the pool. Pivotally mounted within the branch 18 is a floating weir 22 which will pivot counterclockwise in Figure 1 as the level of water drops in the collector tank but which because of its buoyancy tends to right itself. In this manner as water is pumped from the collector tank through pipe 24 which is connected to the suction side of a pump, water spills over the weir 22 thereby constantly skimming the surface of the pool.

Positioned within the collector tank below branch 18 is an annular ridge 26 upon which a removable basket 28 rests. Thus all water passing over the weir passes through basket 28 which removes larger objects such as leaves and the like. The basket 28 may be removed by first removing cover 20 and then lifting the basket out.

Positioned beneath the basket 28 in the collector tank 16 is the filter through which the water must pass on its way to the pump. The filter pipe 30 slidably fits into the upper end of a tail piece 32 which has its lower extremity projecting through a suitable aperture in the collector tank 16 and is connected to pipe 24. In this manner the whole filter unit may be easily removed by lifting same and may be installed by sliding the end of pipe 30 into tail piece 32. The filter pipe terminates just below basket 28 and has sets of holes 34 therein for a purpose hereinafter to be described. Fitting onto the filter pipe 30 are a plurality of spacers 36 which in this embodiment are circular and have a number of tapered ribs 38 spaced therabout which gradually reduce in height from the hub 40 of the spacer to its periphery. Positioned between the ribs are a series of studs 42 which are of greater length adjacent the hub 40 and gradually reduced in length as the periphery of the spacer is approached. The hub of a spacer has a plurality of bores 44 therethrough which communicate with holes 34 in the filter pipe 30.

The filter is formed of a suitable fabric bag 46 which fits over the spacers 36 and is held by suitable cords 39 to snugly fit the spacers. These cords are preferably elastic bands similar to rubber bands, which are in a stretched condition while holding the bag 46. Thus, water in the collector tank passes through the filter bag 46 and through bores 44 and holes 34 and hence through filter pipe 30 to pipe 24 and hence the pump.

The cords or tying members 39 may be of any suitable material which will not cut bag 46 and which will not deteriorate in the water in collector tank 16. Also, the ties may be out somewhat from the spacer hubs, as in Figure 6 or in close, as in Figure 7.

In Figure 8 a spacing element 48 is positioned on filter pipe 30 between adjacent spacers 36 and a tie 51 is utilized to tie the bag tightly. The tie in this instance is a stainless steel band having the ends held together by a screw. This has the added advantages of exposing more filtering area to water in the collector tank 16 and also eliminating cramped areas in which debris might tend to accumulate.

To facilitate vacuuming the bottom of the pool an additional pipe 52 pierces the pool wall and terminates in a suitable union in the collector tank 16.

When it is desired to vacuum, the basket 28 is removed and an additional cover 54 (see Figure 4) seats on rim 26 shutting off the lower portion of the collector tank 16 from the upper weir containing portion. The vacuuming attachment (not shown) is connected by hose 56 to pipe 52 and the pump draws water through the filter and hence the vacuum.

An alternative is shown in Figure 9 wherein the vacuum attachment is through opening 58 in cover plate 54.

While what hereinbefore has been described is the preferred embodiment of this invention, it is readily apparent that alterations and modifications can be resorted to without departing from the scope of this invention and such alterations and modifications are intended to be included within the scope of the appended claims.

We claim:

1. A filtering and skimming unit comprising: a collector tank having an open top adjacent the ground surface, a branch on said tank communicating with the surface water level in a pool, a surface skimming device in said branch, a filtering device in said tank below the level of said skimming device, a removable cover between said skimming device and said filter, and a vacuum cleaner attachment in said collector tank between said cover and said filter.

2. A filtering and skimming unit comprising: a collector tank having an open top adjacent the ground surface, a branch on said tank communicating with the surface water level in a pool, a surface skimming device in said branch, a filtering unit in said tank having a central post, a plurality of radially extending spacing members on said post, a filtering bag fitting over said spacing members, tie means holding said bag on said spacing members, positioned in said tank below the level of said skimming device, a removable cover between said skimming device and the filter, and a vacuum cleaner attachment in said collector tank between said cover and said filter.

3. A filtering and skimming unit comprising: a collector tank having an open top adjacent the ground surface, a branch on said tank communicating with the surface water level in a pool, a filtering device in said tank below said branch, a removable cover seating in said tank between said branch and said filter, and a vacuum cleaner attachment in said tank beneath said cover.

4. A filtering and skimming unit comprising: a collector tank having an open top adjacent the ground surface, a branch on said tank communicating with the surface water level in a pool, a surface skimming device in said branch, a filtering device in said tank below the level of said skimming device, a removable cover between said skimming device and the filter and a water inlet to said collector tank permitting flow of water beneath said cover.

5. A filtering and skimming unit comprising: a collector tank having an open top adjacent the ground surface, a branch on said tank communicating with the surface water level in a pool, a filtering device in said tank below said branch, a removable cover seating in said tank between said branch and said filter and a water inlet in said tank delivering water beneath said cover.

References Cited in the file of this patent

UNITED STATES PATENTS

| | | |
|---|---|---|
| 609,769 | Barr | Aug. 30, 1898 |
| 1,074,679 | Wise | Oct. 7, 1913 |
| 1,137,075 | Morris | Apr. 27, 1915 |
| 1,607,027 | Wall | Nov. 16, 1926 |
| 1,673,572 | Liddell | June 12, 1928 |
| 1,830,742 | McKinley | Nov. 3, 1931 |
| 1,982,376 | De Lancey | Nov. 27, 1934 |
| 2,003,658 | Thomas | June 4, 1935 |
| 2,201,849 | Cotterman | May 21, 1940 |
| 2,507,126 | Townsend | May 9, 1950 |
| 2,615,574 | Kracklauer | Oct. 28, 1952 |
| 2,617,764 | Hauber et al. | Nov. 11, 1952 |
| 2,639,251 | Kracklauer | May 19, 1953 |
| 2,701,235 | King | Feb. 1, 1955 |
| 2,826,307 | Pace | Mar. 11, 1958 |

FOREIGN PATENTS

| | | |
|---|---|---|
| 557,393 | Great Britain | Nov. 18, 1943 |